US009692530B2

(12) United States Patent
O'Keeffe et al.

(10) Patent No.: US 9,692,530 B2
(45) Date of Patent: Jun. 27, 2017

(54) ACTIVE ANTENNA SYSTEM AND METHODS OF TESTING

(71) Applicant: ANALOG DEVICES GLOBAL, Hamilton (BM)

(72) Inventors: Conor O'Keeffe, Passage West (IE); Adrian Normanton, Kinsale (IE)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/032,294

(22) PCT Filed: Aug. 15, 2014

(86) PCT No.: PCT/EP2014/067477
§ 371 (c)(1),
(2) Date: Apr. 26, 2016

(87) PCT Pub. No.: WO2015/062761
PCT Pub. Date: May 7, 2015

(65) Prior Publication Data
US 2016/0254870 A1    Sep. 1, 2016

(30) Foreign Application Priority Data
Oct. 29, 2013  (GB) .................................. 1319058.2

(51) Int. Cl.
| | |
|---|---|
| *H04B 17/19* | (2015.01) |
| *H01Q 21/24* | (2006.01) |
| *H04B 17/14* | (2015.01) |
| *H04B 17/21* | (2015.01) |
| *H01Q 1/24* | (2006.01) |
| *H01Q 3/26* | (2006.01) |

(52) U.S. Cl.
CPC ............ *H04B 17/19* (2015.01); *H01Q 1/246* (2013.01); *H01Q 3/267* (2013.01); *H01Q 21/24* (2013.01); *H04B 17/14* (2015.01); *H04B 17/21* (2015.01)

(58) Field of Classification Search
CPC ....................................................... H04B 17/19
See application file for complete search history.

(56) References Cited

U.S. PATENT DOCUMENTS

| 6,252,542 B1 | 6/2001 | Sikina et al. | |
|---|---|---|---|
| 8,391,377 B2 * | 3/2013 | Zhu ........................ | H01Q 1/246 |
| | | | 375/259 |

(Continued)

FOREIGN PATENT DOCUMENTS

| EP | 2270923 A1 | 1/2011 |
|---|---|---|
| EP | 2299774 A1 | 3/2011 |
| WO | WO 2011/131255 A1 | 10/2011 |

OTHER PUBLICATIONS

Examination Report for International Application No. GB1319058. 2, dated Jul. 1, 2016, 4 pages.

(Continued)

*Primary Examiner* — Tuan H Nguyen
(74) *Attorney, Agent, or Firm* — Knobbe Martens Olson & Bear LLP

(57) ABSTRACT

An active antenna test system is described. The active antenna test system comprises an active antenna unit comprising: a plurality of antenna elements; at least one processor; a plurality of transceiver modules operably coupled to the at least one processor and arranged to receive at least one first baseband signal for transmission via at least one of the plurality of antenna elements and arranged to pass at least one second baseband signal thereto received and down-converted from at least one of the plurality of antenna elements; and at least one switching module operably coupling the plurality of antenna modules to the plurality of transceiver modules. The active antenna test system also comprises at least one communication test equipment, such as a radio frequency, RF, test module and at least one baseband processor. The active antenna unit further com- (Continued)

prises at least one externally connectable radio frequency, RF, test port operably coupled to the at least one switching module and arranged to externally couple the at least one communication test equipment to at least one of the plurality of transceiver modules for conductive testing.

20 Claims, 10 Drawing Sheets

(56) References Cited

U.S. PATENT DOCUMENTS

| | | |
|---|---|---|
| 2003/0076115 A1* | 4/2003 | Yamasaki ............... G01R 13/20 324/601 |
| 2007/0190951 A1 | 8/2007 | Lampinen et al. |
| 2012/0064838 A1 | 3/2012 | Miao et al. |
| 2013/0260844 A1 | 10/2013 | Rucki et al. |

OTHER PUBLICATIONS

International Search Report for International Application No. PCT/EP2014/067477, mailed Oct. 14, 2014, 3 pages.
International Search Report for International Application No. GB1319058.2 dated Mar. 14, 2014, 8 pages.
Study of Radio Frequency (RF) and Electromagnetic Compatibility (EMC) requirements for Active Antenna Array System (AAS) base station (Release 12), V12.1.0, Dec. 2013, 73 pages.
Base Station (BS) Radio Transmission and Reception (Release 11), V11.6.0, Jul. 2013, 105 pages.
Lui et al., Test Methodologies for Active Antenna System, 2012 7th International ICST Conference on Communications and Networking in China (CHINACOM), Aug. 2012, 4 pages.
Socowave, "Specifying and Testing Active Antenna Systems", WirelessLAB Active Antenna System SIG, Sep. 15, 2011, 14 pages.
Examination Report for International Application No. GB1310435.1, dated Jun. 28, 2016, 4 pages.

* cited by examiner

FIG. 1 – Prior Art

FIG. 2 – Prior Art

ACTIVE ANTENNA SYSTEM AND METHODS OF TESTING

FIELD OF THE INVENTION

The field of the invention relates to an antenna arrangement and methods of testing, and in particular methods of testing applicable to Active Antenna Systems.

BACKGROUND OF THE INVENTION

In traditional radio networks comprising of basestation(s) and passive antenna systems, there is at least one connectorised 50Ω port on the antenna and at least one connectorised 50Ω port on the basestation that allows signals to be passed there between via at least one 50Ω connectorised cable. The connectors on the base station could be, for example, 7/16 DIN RF connectors or N-type RF connectors. The connectorised 50Ω base station and antenna port(s) can also be used as one or more test port(s), to facilitate test and power calibration of radio frequency (RF) transceiver circuit(s) of the basestation. Advantageously, connectorised 50Ω port(s) used to allow interconnect to antenna can instead be coupled to test equipment to allow measurements to be performed on the signals coupled there between.

FIG. 1 illustrates simplified block diagrams of a traditional base station with an antenna (array) in a transmit 100 and receive 150 configuration. Referring first to the transmit configuration 100, a passive antenna 108 is coupled to a transmit filter 106 via a 50Ω connectorised cable 107. The transmit filter 106 is further coupled to an optional external power amplifier module 104, which, in turn, is coupled to a base station cabinet module 102 via a further 50Ω connector 103. In this manner, the 50Ω connectors 103 and 107 that couple the base station cabinet module 102 to the passive antenna 108 may be utilised as test ports, to allow the transmitter to be tested and calibrated. Optionally the base station cabinet may include the transmit (TX) filter module, 106 and the power amplifier module, 104. Referring now to the receive configuration 150, passive antenna 108 is coupled to a receive filter 156 via a 50Ω connectorised cable 157. The receive filter 156 is further coupled to an external low noise amplifier module 154 that is, in turn, coupled to a base station cabinet module 102 via a further 50Ω connector 153.

As in the transmit configuration the receive (RX) filter 156 and LNA 154 maybe integrated as part of the basestation cabinet 102, As discussed above, the 50Ω connectors 153 and 157 may be utilised as test ports, to allow the receiver to be tested and calibrated. Routinely, the connectorised cable 107 used for transmit testing and the connectorised cable 157 used for receive testing are the same cable, thereby allowing for the sharing of the antenna and feeder cable for both transmit and receive functions. In this case, the transmit filter 106 and receive filter 156 may be combined in the form of a duplex filter.

FIG. 1 refers to the basestation wireless interface standard specification 3GPP™ TS 25.104 definition of transmit and receive test points for specification and conformance testing. In traditional systems, a connectorised 50Ω connection exists for operational modes. In Active antenna systems (AASs) the individual antenna radiating elements are directly connected to their associated radio base station electronics and are integrated in the same housing. In AAS, there is no operational mode requiring a 50Ω connection that is externally connectable. Therefore, currently, in order to carry out conformance testing, the AAS has to be disassembled or (at least a significant portion) partially disassembled in order to access the individual radiating elements within the housing. Testing units in a disassembled or partially disassembled state inherently affects electromagnetic radiation patterns for antenna measurements and, thus, leads to results that would therefore not be representative of the performance expected if the AAS were fully assembled in a field-deployed system.

Further, any form of disassembly requires breaking environmental and security seals, which would compromise the future functionality of the AAS. Another option may be to perform radiative testing. Far field radiative testing does not require disassembly of the AAS, but does require an anechoic chamber. Anechoic chambers are physically large enclosed spaces where the external ambient radiation from commercial RF services is suppressed. Anechoic chambers also suppress interference from the antenna under test (AUT) from radiating to licensed bands in the vicinity of the chamber by being enclosed in a Faraday cage structure. Anechoic chamber walls, floors and ceiling surfaces are covered with RF absorbent conical structures that substantially minimise reflections that could ordinarily impact radiative measurements. The RF absorbent conical structures placed on the inner surfaces of the anechoic chamber help minimise a problem with radiative testing by suppressing multipath signals. Multipath signals would distort, for example, the signal received in a probe antenna measuring an AAS in an anechoic chamber causing a high degree of measurement uncertainty or distorting the results to an indeterminate level.

Further, some AASs can be physically large, and in the case of the 700 MHz to 900 MHz band, the antennas can be in excess of 2 meters high. In the case of a 2 meter high 700 MHz antenna, the far-field can be greater than 55 meters. Therefore, very large anechoic chambers would be required.

In the case of near field testing, the exact physical placement or proximity and orientation of the probe antenna is critical in making accurate measurements, as small changes in the position of the antenna can create many tens of dBs (decibels) difference. The near field probe itself adds a huge degree of uncertainty to the test results and the performance of the probe directly impacts the test results. Further, the near field probe is not suitable for many measurements, such as error vector magnitude (EVM), as the near field combination of signals from multiple sources can distort the signal detected by the probe. Therefore, there can be significant differences between near field, far field and conducted measurements.

Referring now to FIG. 2, a known active antenna system (AAS) 200 is illustrated. The AAS 200 comprises, for example, a Common Public Radio Interface (CPRI) interface 240 for interfacing to a baseband processing unit of a cellular base station, such as a third generation partnership project (3GPP™) evolved NodeB. The cellular base station comprises a baseband processing unit that performs, for example, demodulation and decoding in the receive path and modulation and encoding in the transmit path. The AAS 200 comprises one or more of its own baseband processing circuits 208, which are arranged to perform system control, beamform manipulation and additional signal processing.

The AAS 200 comprises a plurality of parallel transceiver circuits 201, consisting of a transmit module 204 and a receive module 206. Transmit module 204 and receive module 206 within the transceiver 201 are also operably coupled to the antenna arrangement 210, as shown.

In this case, the antenna arrangement 210 comprises an antenna array having a plurality of cross polarised (XPOL)

antenna elements employing, for example, both +45° and −45° orthogonal antenna elements, with an independent transmit module 204 and receive module 206 connected to each antenna port.

As discussed, current standards bodies only suggest 'conductive' test methods to be performed on the 50Ω (test) port of a basestation or of a passive antenna system. This is not possible for the active antenna module 200 in FIG. 2, as this connection point is incorporated into a sealed unit 202 within the AAS. Therefore, the only way to access active antenna module 200 is to disassemble the AAS and test at each active antenna module and each antenna element feed separately. This is not practical for reasons outlined heretofore for the active antenna module 200 in FIG. 2, as this connection point is incorporated into a sealed unit 202 within the AAS. Therefore, the only known way to access active antenna module 200 is to disassemble the AAS and test each active antenna module and each antenna element feed separately.

Therefore, it may be advantageous to determine an alternative mechanism for determining the operational status, performance and functionality of various components, circuits or modules in an AAS without disassembling the system.

SUMMARY OF THE INVENTION

Accordingly, the invention seeks to mitigate, alleviate or eliminate one or more of the above mentioned disadvantages, either singly or in any combination.

According to a first aspect, an active antenna test system comprises: an active antenna unit comprising a plurality of antenna elements; at least one processor; a plurality of transceiver modules operably coupled to the at least one processor and arranged to receive at least one first baseband signal for transmission via at least one of the plurality of antenna elements and arranged to pass at least one second baseband signal thereto received and down-converted from at least one of the plurality of antenna elements. The active antenna unit further comprises at least one switching module is operably coupled to a plurality of antenna element feeds of the plurality of antenna modules to the plurality of transceiver modules; and at least one communication test equipment. The active antenna unit further comprises at least one externally connectable radio frequency, RF, test port operably coupled to the at least one switching module and arranged to externally couple the at least one communication test equipment to at least one of the plurality of transceiver modules for conductive testing.

In one optional example, in a receive mode of operation, the RF test module may conductively apply at least one RF test signal to the at least one externally connectable RF test port and the at least one switching module is arranged to route the RF test signal through a selected receive module.

In one optional example, the selected receive module may route a digitised representation of the RF test signal to the baseband processor to determine a performance of the receive module.

In one optional example, the baseband processor may be arranged to determine a performance of the receive module comprises the baseband processor being arranged to successively receive at least one test signal from determine whether a fault exists in any of the receive modules.

In one optional example, in a transmit mode of operation, the baseband processor may conductively apply a baseband test signal to the at least one processor of the active antenna unit that routes the baseband test signal through a selected transmit module.

In one optional example, the at least one switching module may be arranged to route the RF test signal from the selected transmit module to the at least one communication test equipment via the externally connectable RF test port to perform at least one from a group of: determine whether a fault exists or measure a performance of the transmit module.

In one optional example, a plurality of transmit modules may be successively selected, such that the at least one communication test equipment is able to determine a performance of the transmit module.

In one optional example, the at least one communication test equipment may be arranged to determine whether a fault exists in any of the transmit modules.

In one optional example, a calibration transceiver may be operably coupled to the at least one switching module and arranged to selectively apply signals to the externally connectable RF test port via the at least one switching module or receive signals from the externally connectable RF test port via the at least one switching module to determine a performance of the calibration transceiver.

In one optional example, the at least one switching module may comprise a switched coupler network comprising a plurality of coupler ports and receives a control signal from the at least one processor in order to select a transmit module or receive module for routing a test signal via at least one of the plurality of coupler ports.

In one optional example, the at least one communication test equipment may comprise at least one from a group of: a radio frequency, RF, test module and at least one baseband processor.

In one optional example, the at least one communication test equipment may further comprise a scaling process arranged to scale a conductively coupled signal to negate a transfer function of a signal routed between the externally connectable RF test port and a respective antenna port. In one optional example, the scaling process may be operably arranged modify at least one test result using a scaling factor that is accessible to a tester. In one optional example, the scaling process may use a table of transfer functions that represent a matrix of transfer functions for a plurality of combinations of antenna elements to the at least one externally connectable RF test port.

In one optional example, the table of transfer functions may comprise at least one from a group of: a S-parameter table, a H-parameter table, a X-parameter table, a Y-parameter table, a Z-parameter table for at least one RF frequency of operation.

In one optional example, the at least one baseband processor may be arranged to compare a generated test signal with a representation of the test signal having passed through a transceiver module under test.

In one optional example, the at least one communication test equipment may further comprise at least one of the following: a local monitor terminal operably coupled to the at least one baseband processor and arranged to determine a performance or a component or circuit fault in the active antenna unit, a vector voltmeter or a vector analyser operably coupled to the local monitor terminal arranged to determine a vector error due to a component or circuit fault in the active antenna unit, a signal generator arranged to generate a test signal at a radio frequency or at baseband.

According to a second aspect, an active antenna unit comprises: a plurality of antenna elements; at least one processor; and a plurality of transceiver modules operably coupled to the at least one processor and arranged to receive at least one first baseband signal for transmission via at least one of the plurality of antenna elements and arranged to pass at least one second baseband signal thereto received and down-converted from at least one of the plurality of antenna elements. The active antenna unit further comprises at least one switching module operably coupling a plurality of the antenna element feeds of the plurality of antenna modules to the plurality of transceiver modules; and at least one externally connectable RF test port operably coupled to the at least one switching module and arranged to externally couple at least one of the plurality of transceiver modules to at least one communication test equipment for conductive testing.

According to a third aspect, a method of testing an active antenna system comprises a plurality of antenna elements operably coupled, via at least one switching module, to a plurality of transceiver modules. The method comprises: coupling at least one communication test equipment to at least one externally connectable RF test port of the active antenna system wherein the at least one externally connectable RF test port is coupled to the at least one switching module; selectively coupling the at least one externally connectable RF test port, via the at least one switching module, to at least one of: a radio transmit module under test, a radio receive module under test; conductively coupling a test signal via the at least one external RF test port to or from the transceiver module under test; and performing at least one signal measurement on the test signal passing through the transceiver module under test.

In one optional example, the method may further comprise at least one from a group of: successively selecting a plurality of receive modules to determine whether a fault exists in any of the receive modules; successively selecting a plurality of transmit modules to determine whether a fault exists in any of the transmit modules; selectively coupling a test signal via the externally connectable RF test port and the at least one switching module to a calibration transceiver in the active antenna system to determine whether a fault exists in the calibration transceiver.

In one optional example, the method may further comprise scaling a conductively coupled test signal to negate an effect on a test result of a transfer function of a signal routed between the externally connectable RF test port and a respective antenna port of the active antenna system.

In one optional example, the method may further comprise storing in a memory element a plurality of scaled factors to be accessible to a tester.

In one optional example, the scaling may comprise employing a table of transfer functions that represent a matrix of transfer functions for a plurality of combinations of antenna elements to a plurality of external RF test ports for at least one frequency of test. In one optional example, the table of transfer functions may comprise at least one from a group of: a S-parameter table, a H-parameter table, a X-parameter table, a Y-parameter table, a Z-parameter table for at least one frequency of test.

In one optional example, the method may further comprise at least one from a group of: comparing a measured result of the test signal having passed through the transceiver module under test with at least one predetermined upper or lower limit value; comparing a scaled measured result of the test signal having passed through the transceiver module under test with at least one predetermined upper or lower limit value; comparing a measured result of the test signal having passed through the transceiver module under test with the generated test signal.

According to a fourth aspect, a non-transitory computer program product comprises executable program code for performing the method of testing an active antenna system of the third aspect, when executed at an active antenna test system.

BRIEF DESCRIPTION OF THE DRAWINGS

Embodiments of the invention will be described, by way of example only, with reference to the accompanying drawings, in which.

DETAILED DESCRIPTION

Example embodiments of the invention are described with reference to smart (or active) antenna technology used in a wireless communication system.

The following description focuses on embodiments of the invention that are applicable to active antenna arrays employed in Universal Mobile Telecommunication System (UMTS) cellular communication systems and in particular to a UMTS Terrestrial Radio Access Network (UTRAN) operating in a $3^{rd}$ generation partnership project (3GPP™) system, and evolutions to this standard such as HSPA+ or long term evolution (LTE) system. However, it will be appreciated that the invention is not limited to this particular cellular communication system, but may be applied to any wireless communication system, including satellite communication systems, employing antenna arrangements.

Figure 1:
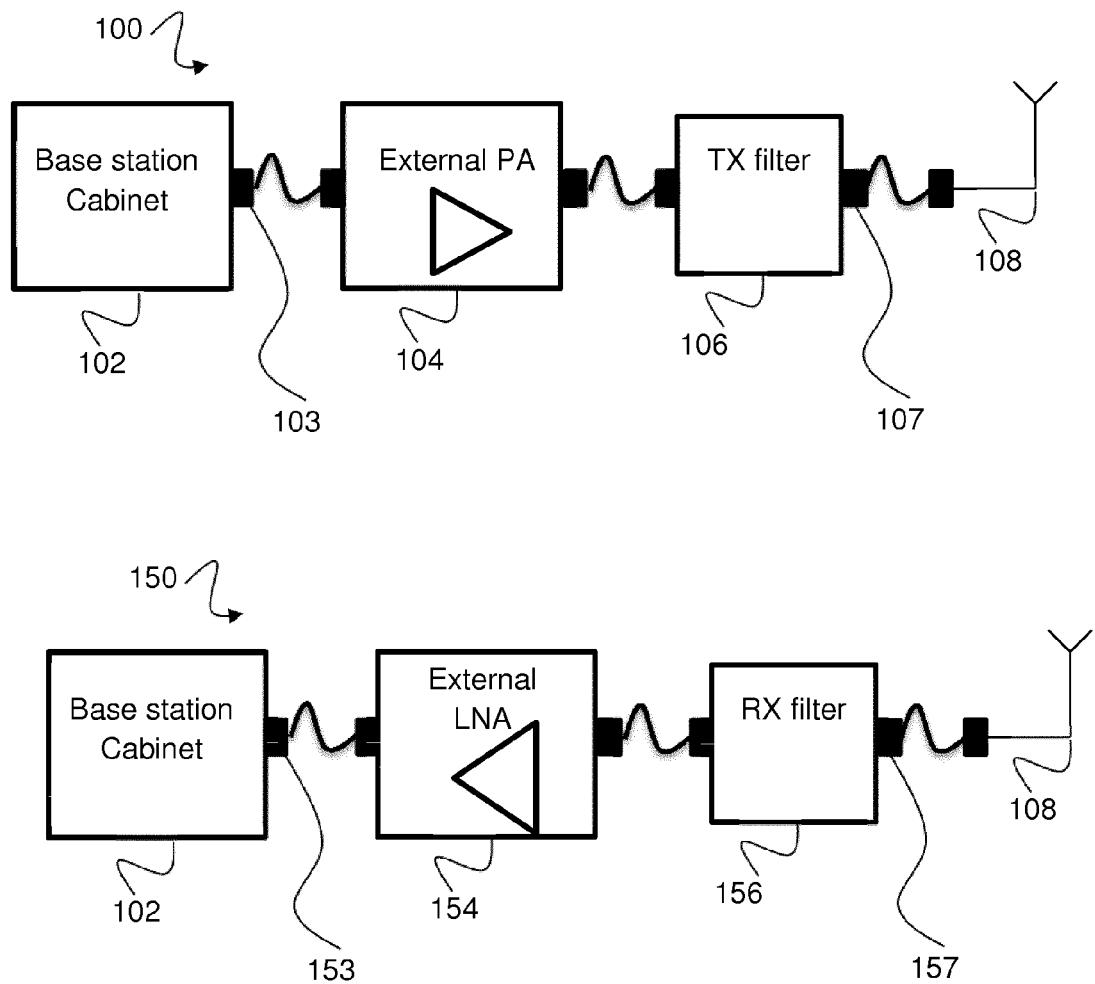
FIG. 1 illustrates simplified block diagrams of a traditional base station with an antenna measurement port in transmit and receive configuration.
Figure 2:
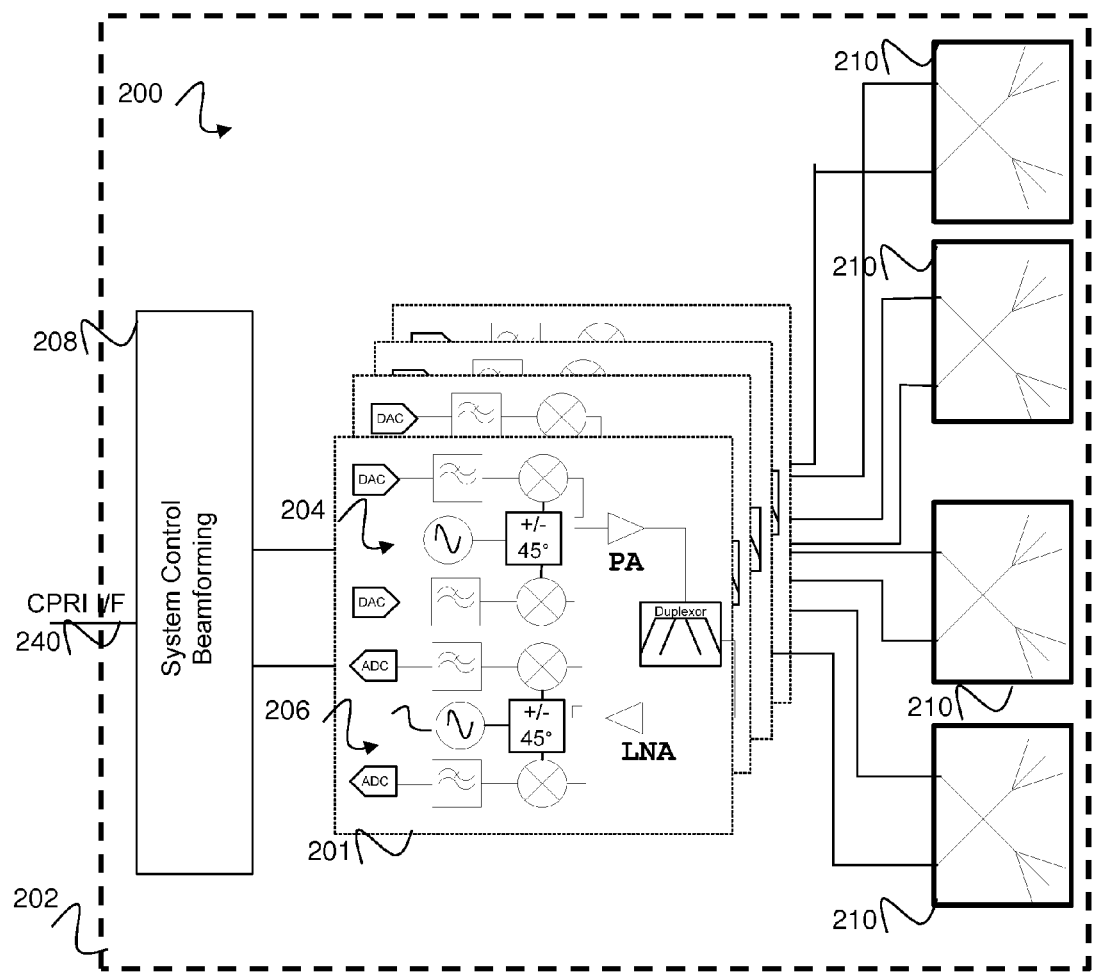
FIG. 2 illustrates a simplified example of a known active antenna system.
Figure 3:
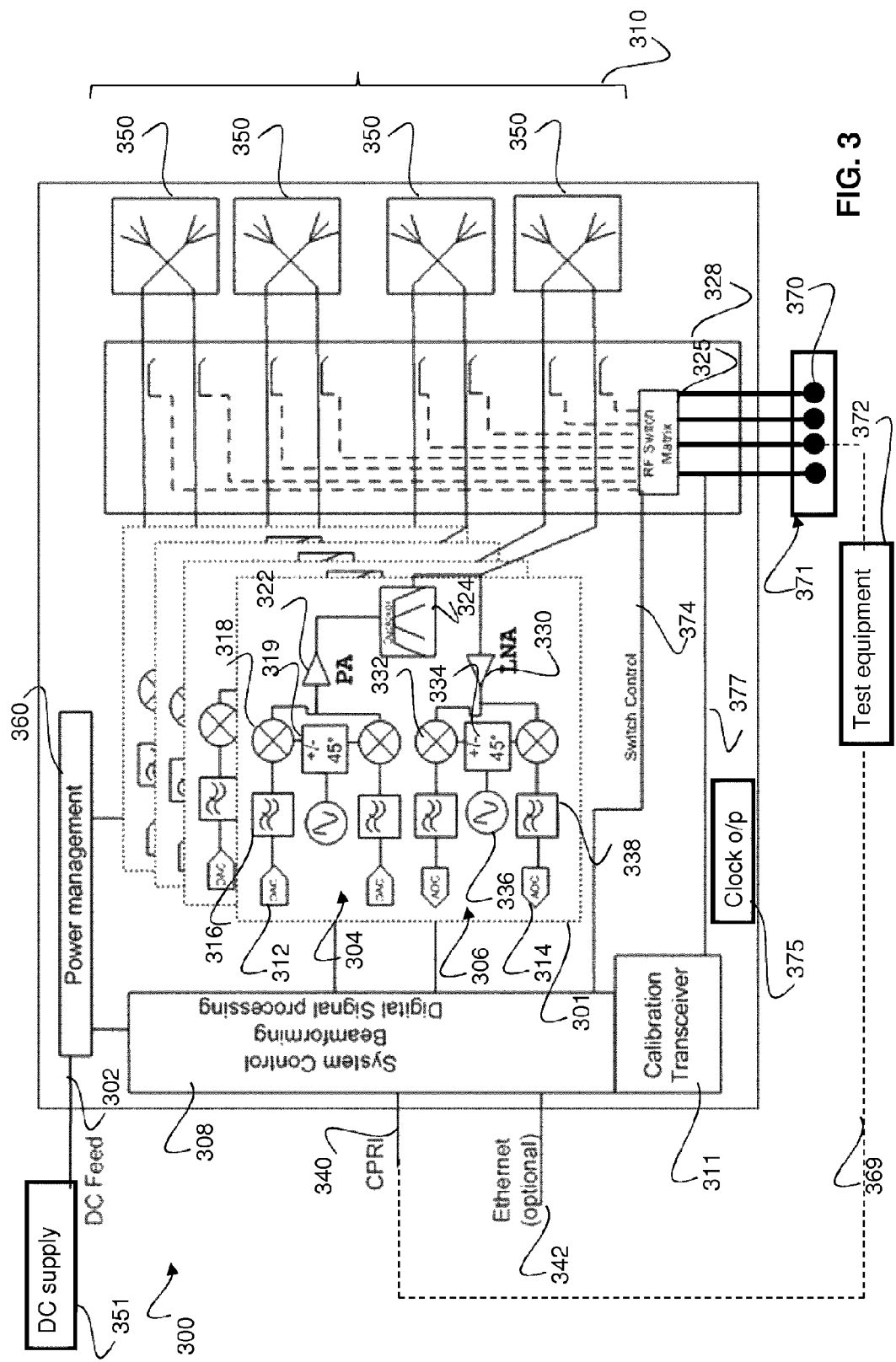
FIG. 3 illustrates an example of an active antenna system adapted to support aspects of the invention.

Referring to FIG. 3, an example of an AAS 300 adapted to support example embodiments of the invention is illustrated. The example AAS 300 comprises a CPRI interface 340 for interfacing to a baseband processing unit of a cellular base station, such as a third generation partnership project (3GPP™) evolved Node B (not shown). In other examples, alternative interfaces may also be employed such as for example Open radio interface (ORI) or OBSAI-RP 301. The cellular base station comprises at least one baseband processing unit that performs demodulation and decoding in the receive path and modulation and encoding in the transmit path. Multiple-in/multiple-out (MIMO) data is transferred between the base station baseband processing unit and the AAS 300. The AAS 300 comprises one or more of its own baseband processing circuits e.g. digital signal processor 308, which, in some examples, may be arranged to perform one or more of: system control, beam form manipulation and additional signal processing. Example embodiments of the invention utilise a plurality of parallel transceiver paths, equivalent often to a number of antenna elements used. In one example embodiment, a further transceiver path may be included to provide a dedicated common self-calibration transceiver path.

The AAS 300, which in one example may contain a radio frequency (RF) transmit subsystem of a communication network element or broadcast transmitter, comprises a plurality of parallel transceiver circuits 301 operably coupled via a switch coupler structure 328 to an antenna array 310 comprising, in this example, an array of cross-polarised antenna elements 350. A transmit module 304 and a receive module 306 within the transceiver 301 are operably connected to the antenna arrangement 310, as shown, in order to facilitate wireless communications.

In both a normal transmit mode and calibration transmit mode of operation, quadrature (I-Q) sample pairs are input to the digital signal processor 308 and filtered in low pass filters (not shown) for each of the individual transmit paths, as well as providing a reference to the transmit beamform array calibration processing. Complex scaling modules (not shown) apply one or more complex scalar values stored in one or more memory modules to each of the respective 'I' and 'Q' pair baseband signals generated in the digital signal processor 308, for example, to accommodate for the polarisation type being used in the transmit operation. A complex scalar (sometimes referred to as complex multiplier) consists of a module where for each complex IQ sample, the module multiplies the IQ sample by another complex term in a form, such as $\{(I+jQ)\times(Z+jY)\}$, where the resultant is another complex number. The letter is used to denote the complex number operator. The digitally modified 'I' and 'Q' pair signals are then input to digital-to-analog converters (DACs) 312, for example, and thereafter the analogue signal is filtered in low pass filter 316. The baseband analog signals are then up-converted in up-mixer circuitry 318, 319 and combined prior to amplifying in power amplifier 322. The radio frequency, power amplified signals are then fed to the antenna array 310 via a duplexer 324 and coupler structure 328.

In both a normal receive mode and calibration receive mode of operation, each receiver circuit is operably coupled, via the coupler structure 328, to a XPOL antenna element 350 that is capable of receiving polarisation diversity signals. The received signals detected from the XPOL antenna element 350 are processed by the coupler structure 328, followed by processing in respective duplexer filter 324, and by respective low-noise amplifiers (LNA) 230. The LNAs 330 provide amplified versions of the received signals to a quadrature mixer 332 in order to generate respective quadrature and 'Q') down-converted signals. The quadrature mixer 332 is arranged to down-convert the respective amplified received signals based to a frequency down-conversion by selecting a local oscillator signal 336 frequency. Down conversion local oscillator signals are fed in quadrature format from local oscillator generation sub-systems 336, 330. The quadrature mixer 332 output of quadrature down-converted amplified received signals are input to respective low-pass filters 338 and thereafter to respective analogue-to-digital converters 314 to transform the quadrature down-converted received signal to a digital form. The resultant digital signals are passed to the digital signal processing module 308 for processing, including filtering and/or digital down conversion and beamforming.

In some examples, the AAS 300 further comprises a dc power management module 360 fed by a dc feed 302, from a dc supply module 351. The dc power management module 360 manages a dc supply to the various respective components and circuits within the active AAS 300. In one example, the DC supply cable may comprise a 0V, −48V and an earth wire. The operation of the DC power management module 360, and any clock generation function or module (not shown), is not described herein for the sake of simplicity. Further, AAS 300 may also comprise an optional Ethernet connection 342 for connection to, for example, an optional test configuration control terminal.

A self-calibration signal feedback path 377 is also provided using the coupler structure 328. In this context, a relatively small proportion of for example a transmit signal, say −30 dB, or a larger representative portion of a signal, say 10 dB, is coupled to a coupled port that is fed into self-calibration signal feedback path 377 via a radio frequency switch matrix 325. In one example, the radio frequency (RF) switch matrix 325 is placed on the feedback path, such that a single detection path, input to the calibration transceiver 311, can be used for the plurality of transceivers. The signal presented from a transmitter on the self-calibration signal feedback path 377 may be arranged, following processing in the calibration transceiver 311, to provide detection of phase, amplitude and/or latency mismatch of the transmitted signals with respect to other transmit signals output from the plurality of transmitters. In some instances, the internal calibration transceiver may not be able to calibrate the AAS 300 correctly. This may be, for example, if following a failure with one or more components within the AAS. In particular, in current AAS architectures, the calibration transceiver 311 would be used to detect where the failure has occurred within the AAS 300.

However, in accordance with examples of the invention, at least one external RF test port 370 is operably coupled to RF switch matrix 325. In one example, the at least one external RF test port 370 may comprise an externally connectable RF test port module 371 comprising at least one external RF test ports. In one example, the at least one external RF test port 370 may be operable to receive 'conducted' transmit signals routed from one or more selected coupled paths 327 in from coupler structure 328. In an alternative example, the at least one externally connectable RF test port module 371 may be configured to apply one or more test signals from test equipment 372 routed to at least one receive module 306 within the AAS 300.

In some examples, there may be a plurality of external connectable RF test port modules 371 operably coupled to RF switch matrix 325. In such an example an external connection may be selectable to couple signals to/from the calibration transceiver 311 in order to detect, for example, whether the calibration transceiver (or a component, module or circuit located therein) has failed. In some examples, there may be 'N' number of externally connectable RF test port modules 371, wherein the total number, 'N', is less than the number of available antenna elements 350 or coupled paths 327 in the coupler structure 328.

Thus, RF switch matrix 325 may be configurable to selectively couple one or more receive and/or transmit coupled paths 327 to one or more externally connectable RF test port modules 371. In this example, test equipment 372 may comprise, for transmit mode testing one or more of the following: power meters, spectrum analysers and Error Vector Magnitude meters. For receive mode testing, test equipment 372 may comprise one or more of the following: one or more signal generator(s) to generate RF carrier frequencies with modulated signals, protocol generators, interference sources, signal combiners and fading sources.

The externally connectable RF test port module 371 may comprise of at least one connectorised cable connectable to, for example, RF test equipment. In one example, the RF test port module 371 may be a cable harness, where a plurality of cables is capable of being connected to the RF test equipment. The cables may have a characteristic impedance of approximately 50Ω. Connectors on the cable may include for example, SMA, MCX, BNC or N-type.

In some examples, it may be necessary for some of the test equipment 372 to be frequency locked to a clock source common to the AAS 300. This may be achieved by some of the test equipment 372 outputting a clock reference to a base band unit (not shown) or vice versa. In other examples, the AAS may comprise an optional shared clock output 375, which may be operably coupled to its own test ports.

Figure 4:
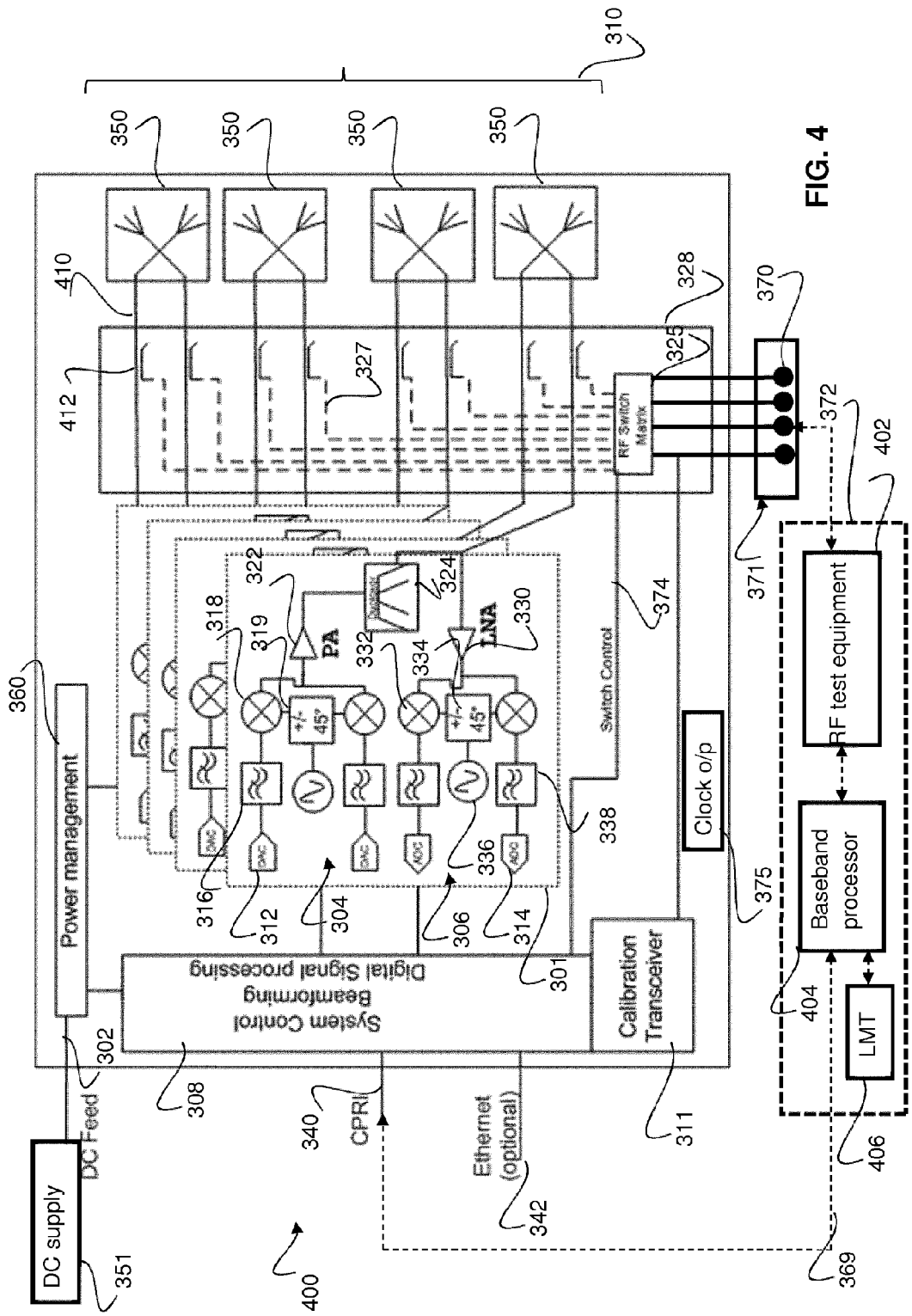
FIG. 4 illustrates an example of a further active antenna system adapted to support aspects of the invention.

Referring to FIG. 4, an example of a further simplified AAS 400 is illustrated according to aspects of the invention. In this example, most of the features are similar to those illustrated in FIG. 3 and, therefore, only additional features will be discussed in detail.

In this example, test equipment module 372 may comprise RF test equipment 402 that may be operably coupled to at least one external RF test port module 371, a baseband processor 404, which in one example may be operably coupled to the RF test equipment 402 and operably coupled to the AAS via CPRI interface 340, and a local monitor terminal (LMT) 406, which may be operably coupled to the base band processor 404. In some examples, the baseband processor 404 may instead be situated within the AAS 400. In this case, the LMT 406 may be operably coupled to the baseband processor 404 within the AAS 400, rather than within test equipment 372. In other example embodiments an LMT may be connected to an optional Ethernet port 342 of the AAS 400, for example in order to invoke and/or configuration test modes of operation.

As discussed previously, there may be examples where there is a failure with one or more components within the AAS 400 that cannot be determined by calibration transceiver 311. Furthermore, radiative testing within an anechoic chamber may not be feasible. Therefore, in this example, the LMT 406 may be operable to invoke one or more receive or transmit test modes in order to determine whether there is a failure within AAS 400, and in some examples where that fault is likely to have arisen. The LMT 406 may be operable to invoke a receive test mode via the baseband processor 404 and the RF test equipment 402. In this case, the at least one externally connectable RF test port module 371 is operable to receive a test signal transmitted from the RF test equipment 402, which is routed via the RF switch matrix 325 onto at least one receive module 306 to be tested. In this example, the RF switch matrix 325 may be operable to select which external test port 370 in the externally connectable RF test port module 371 to utilise, if there is more than one, and which antenna element feed that the test signal should be coupled to, for example antenna element feed 410. In this example the test signal may be coupled to the antenna element feed 410 via a coupler, for example coupler 412, from coupler structure 328. In this way, RF switch matrix 325 may allow a test signal to be operably coupled to a desired receive module 306 of transceiver module 301 via a desired antenna element feed 410. The at least one receive module 306 of transceiver module 301 may then be operable to output a resultant signal, which is then processed by the beamforming and digital signal processing module 308 and then routed via the CPRI interface 340 to the baseband processor 404. In one example, the baseband processor 404 may have already also received, or be configured to detect, a representation of the test signal transmitted from the RF test equipment 402 direct. The baseband processor 404 may then be operable to compare the resultant signal output from the CPRI interface 340 with the received representation of the test signal transmitted by the RF test equipment 402. In other examples, the baseband processor 404 may then be operable to compare the resultant signal output from the CPRI interface 340 with at least one predetermined upper or lower limit. In this manner, the baseband processor 404 may be operable to determine whether there is a failure with the at least one receive module 306 and/or at least one antenna element feed 410 for example a bit error rate. In some examples, the LMT may then re-configure the AAS to route the test signal via another receiver path, in order to determine whether a fault may exist on that path.

As discussed, in some examples, the calibration transceiver 311 may be malfunctioning. In this case, a test signal may be coupled to at least one externally connectable RF test port module 371 coupled to an input to the calibration transceiver 311. Therefore, the baseband processor 404 may be operable to determine whether there is a failure with the calibration transceiver 311 that may otherwise not be possible to detect without the at least one external RF test port module 371. In some examples, there may only be one external RF test port module 371 that is operably coupled to RF switch matrix 325 and calibration transceiver 311.

In the examples shown hereintofore, the tests are primarily aimed at identify failures in circuitry. In other examples, the illustrated tests may also be used to characterise the performance of a unit that does not necessarily include an identification of a circuit, device or module failure.

In another example, the LMT 406 may be operable to invoke a transmit test mode via the baseband processor 404 and the CPRI interface 340. In this case, a transmit test signal is transmitted by the baseband processor 404, via CPRI interface 340, to at least one transmit module 304. The at least one transmit module 304 may process the transmit test signal before outputting a resultant signal to RF switch matrix 325, via at least one coupler 412 from the coupler structure 328 and desired antenna element feed 410. In some examples, the RF switch matrix 325 may be operable, during a test mode, to route a coupled portion of the resultant signal via the at least one externally connectable RF test port module 371 rather than to the calibration transceiver 311. For example, this re-configuration may be used if the calibration transceiver 311 is not required to calibrate the AAS 400. As such the test may be scheduled to be run when the calibration sequence is not run. The resultant signal may then be transmitted to the RF test equipment 402 before optionally being passed to the baseband processor 404. The baseband processor 404 may perform a comparison between the transmit test signal routed to the at least one transmit module 304, via the CPRI interface 340, and the resultant signal received via the at least one external RF test port module 371. In some examples the signal is not passed to the baseband processor and figures of merit of the transmitter may be measured using the test equipment only. These measurements may include, for example, output power, spectral mask compliance and/or error vector magnitude tests. In this way, the baseband processor module 404 or the RF test equipment 402 may be operable to determine whether there is a fault or to measure a parameter linked to a figure merit with the AAS 400, and in some examples where that fault may arise. In some examples, the LMT may then re-configure the AAS to route the test signal via another transmit path, in order to determine whether a fault or to measure performance may exist on that path.

Figure 5:
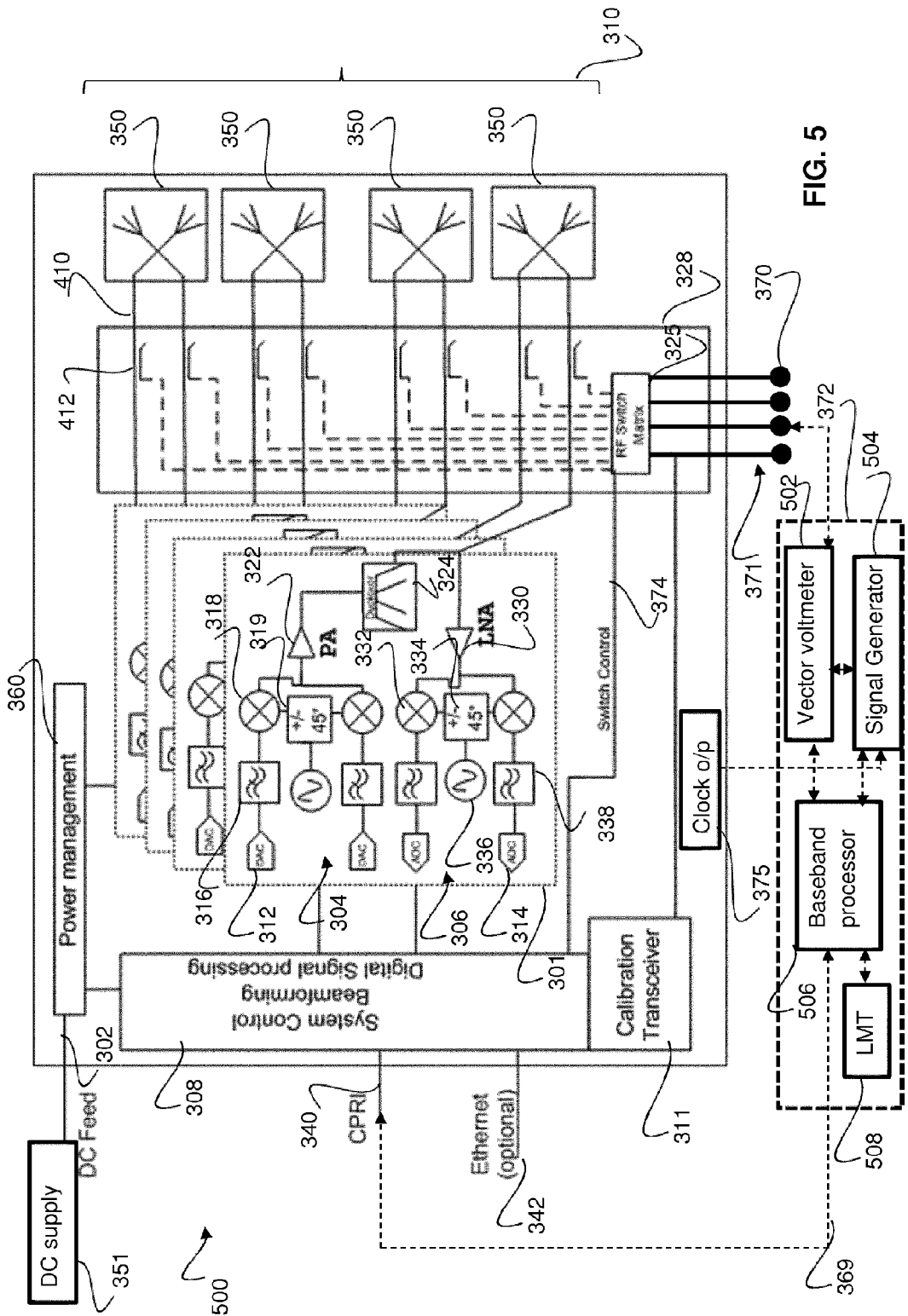
FIG. 5 illustrates an example of a yet further active antenna system adapted to support aspects of the invention.

Referring to FIG. 5, an example of a further AAS 500 is illustrated according to aspects of the invention. In this example, most of the features are similar to those illustrated in FIG. 3 and, therefore, only additional features will be discussed in detail.

In this example, test equipment module 372 may comprise a vector voltmeter 502 that may be operably coupled to at least one test port of the externally connectable RF test port module 370. A signal generator 504 may be operably coupled to the vector voltmeter 502 as well as to shared clock output 375 of AAS 500. A baseband processor 506 may be operably coupled to the signal generator module 504 to output IQ data signals such as that communicated over the CPRI interface 340. Again, a LMT 508 may be operably coupled to the baseband processor 506. In some examples, the baseband processor 506 may be situated within the AAS 500. In this case, the LMT 508 may be operably coupled to the baseband processor 506 within the AAS 500, rather than within the test equipment 372. In some examples, the test equipment 372 may be operable to successively measure phase and amplitude of respective test signals on any desired antenna element feed, for example antenna element feed 410.

In an example, the LMT 508 may be operable to invoke a receive test mode via the baseband processor 506, signal generator 504 and the vector voltmeter 502. In this case, the at least one external RF test port module 370 is operable to route a receive test signal transmitted from the signal generator 504 via the RF switch matrix 325 onto at least one receive module 306 to be tested via, for example, coupler 412. In this case the test signal may be routed via coupler 412 in coupler structure 328 on the antenna element feed, for example antenna element feed 410. The at least one receive module 306 may then be operable to output a resultant signal, which is then processed by the beamforming and digital signal processing module 308 and then routed via the CPRI interface 340 to the baseband processor 506. The baseband processor 506 may also communicate a representation of the CPRI interface signal to the vector voltmeter, which is compared to the representation of the test signal transmitted from the signal generator 504. Alternatively, in other example embodiments the signal on the CPRI interface may be communicated to the vector voltmeter directly without passing through the baseband processor 506. The baseband processor 506 may then be operable to compare the signal transmitted via the at least one externally connectable RF test port module 370 (via receive module 306 and CPRI interface 340) with the representation of the test signal received from the signal generator 504, as determined by the vector voltmeter 502. In some examples, the LMT may then re-configure the AAS to route the test signal via another receive path, in order to determine the phase and amplitude of the signal propagating there through.

In one example, a result of a single test using the vector voltmeter may be a difference in phase and/or amplitude of the signal presented on the CPRI interface to that presented through the coupler 412 on the antenna element feed 410.

By repeating this test for a plurality of antenna element feeds, a determination may be made for the phase and amplitude of each response of the signal presented from each element from the common feed point, namely the CPRI interface 340. Thus, in this manner, a table of phase/amplitude weighting of signals processed at each element may be determined. In one example, this may allow, with some mathematical processing, for the determination of a beamshape conformance and accuracy of any array calibration algorithm that is being run.

In another example, the LMT 508 may be operable to invoke a transmit test mode via the baseband processor 506 and the CPRI interface 340 or via the optional Ethernet interface 342. In this case, a transmit test signal is transmitted by the baseband processor 506, via CPRI interface 340, which is then processed by the beamforming and digital signal processing module 308 and then routed to at least one transmit module 304. The at least one transmit module 304 may then be operable to output a resultant transmit signal, using the transmit test signal routed from the baseband processor module 506 to RF switch matrix 325, via at least one coupler 412 from the coupler structure 328 and desired antenna feed 410, for example. The at least one externally connectable RF test port module 370 receives the resultant transmit signal from the RF switch matrix 325 and relays it to vector voltmeter 502, which, subsequently, is configured to use the signal provided over the CPRI interface to form a vector voltmeter measurement. In an example, the vector voltmeter 602 may be operable to perform a comparison between the transmit test signal transmitted to the at least one transmit module 304 as coupled at the coupler 412, and a representation of that signal processed as presented on the CPRI interface.

A vector voltmeter, for the purposes of clarity in the embodiment described herein, is a measurement equipment capable of determining a difference between two signals in both amplitude and phase. The equipment has two inputs: a reference signal input and a measure signal input. The resultant measurement is the difference between both signals. For clarity the input signals may be of digital or analog or RF formats.

In some examples, the LMT may then re-configure the AAS to route the test signal via another transmit path, in order to perform a transfer function of that path in terms of phase and amplitude with respect to a reference signal, thereby confirming a performance level of an array calibration algorithm and/or implementation of a beamform weight on a signal.

In another example, the vector voltmeter 502 may be capable of discerning a voltage amplitude and phase of the resultant test signal from transmit module 304, via at least one external RF test port module 370, as switched through RF switch matrix 325 and coupled through a coupler 412 of antenna element feed 410. In this example, the resultant test signal is compared to a reference signal generated by signal generator 504 using the IQ signal data that was communicated from the baseband processor 606 over the CPRI interface 340 and used by the transmit module 304. Notably, this data had been processed by the beamforming and digital signal processing module 308.

In a further example, a vector voltmeter function may also be implemented by down converting and digitising the test signal, as selected to be presented on externally connectable RF test port module 370, and comparing the down-converted and digitised test signal with a signal reference being presented on the CPRI interface 340 in being transmitted by at least one antenna element feed 410 using, say, bespoke test hardware. In one example, this bespoke hardware may, for example, implement a vector comparison of both signals in the digital domain in order to provide a measurement estimation of the amplitude and phase differences. In one example, this could be an implementation of a system that performs a comparison using adaptive filter techniques, such as least mean squares in order to determine an amplitude and phase relationship between a reference signal and a signal presented on the externally connectable RF test port module 370. The bespoke hardware may comprise of one or more or all of the following: the down conversion module, the digital to analogue convertor module, comparison logic and interface for relaying test results and an interface for accepting a digital reference signal.

Testing for the amplitude and phase results of a signal presented to each of a plurality of elements of an array will allow for a means to calculate the resultant beam shape. The amplitude and phase measurements combined with known information, such as the dimensions, spacing of elements of the array, etc. allows for accurate estimation of the radiative beamshape being generated by the AAS without the need to characterise all units in a facility, such as an anechoic chamber. This advantageously limits the physical resources and time required to perform a test.

Figure 6:
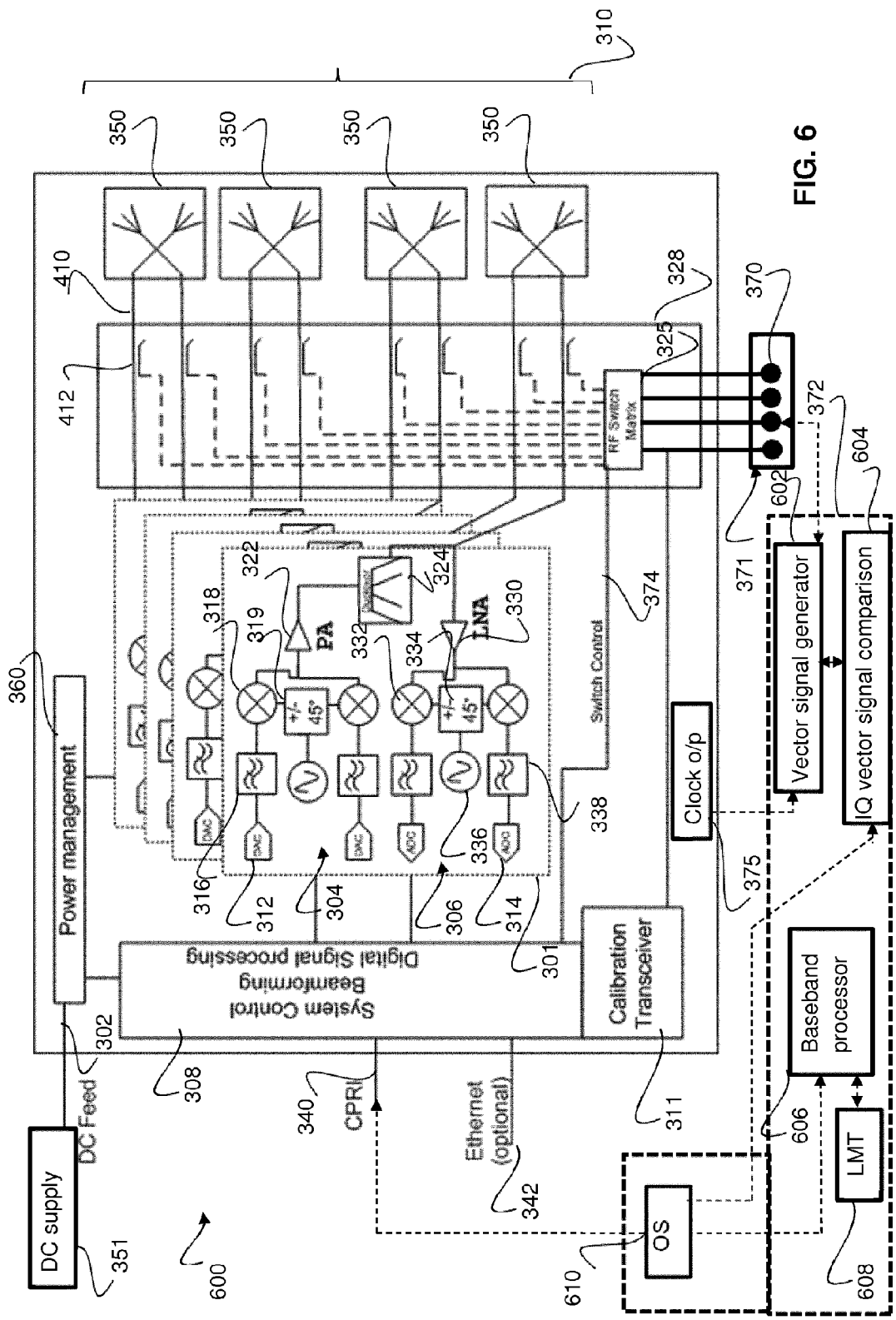
FIG. 6 illustrates an example of a still yet further active antenna system adapted to support aspects of the invention.

Referring to FIG. 6, an example of a further AAS 600 is illustrated according to aspects of the invention. In this example, most of the features are similar to those illustrated in earlier figures and, therefore, only additional features will be discussed in detail.

In this example, test equipment module 372 may comprise a vector signal generator 602 that may be operably coupled to at least one externally connectable RF test port module 370 and to shared clock 375. An IQ vector signal comparison module 604 may be operably coupled to the vector signal generator 602 and to an optical splitter 610. A baseband processor 606 may be operably coupled to CPRI interface 340 via the optical splitter 610. One purpose of the optical splitter 610 is to allow a portion of the signals passing between the AAS 600 and baseband processor 606 to be siphoned off, thereby allowing these siphoned signals to be detected by the IQ vector signal comparison module 604 without interrupting or causing adverse degradation in performance to the optical link between the AAS 600 and the baseband processor 606. LMT 608 may also be operably coupled to the baseband processor 606, or optionally the AAS 600 through, for example, Ethernet port 342. In some examples, the baseband processor 606 may be situated within the AAS 600. In this case, the LMT 608 may be operably coupled to the baseband processor 606 within the AAS 600, rather than within the test equipment 372.

In an example, the LMT 608 may be operable to invoke a receive test mode and, therefore, vector signal generator 602 is operable to produce and route a receive test signal via at least one externally connectable RF test port module 370 to RF switch matrix 325, and forward a representation of the receive test signal to the IQ vector signal comparison module 604. The RF switch matrix 325 is operable to route the test signal to at least one receive module 306 to be tested, via at least one coupler 412 on antenna element feed 410, wherein the at least one receive module 306 outputs a resultant test signal that is then processed by the system control and beamforming module 308 and then output via the CPRI interface 340 to optical splitter 610. The optical splitter 610 may be operable to route a portion of the resultant receive test signal to the baseband processor 606 and the remainder of the receive test signal to the IQ vector signal comparison module 604. At the IQ vector signal comparison module 604, the resultant receive test signal may be reconstructed from the CPRI serial format to an IQ vector signal and compared with the copy of the IQ receive test signal initially transmitted by the vector signal generator 602, in order to allow the IQ vector signal comparison module 604 to calculate, say, an amplitude and phase difference between theses test signals.

In a further example, the LMT 608 may be operable to invoke a transmit test mode and, therefore, baseband processor 606 may be operable to transmit, via the CPRI interface 340 and optical splitter 610, a test signal to at least system control and beamforming module 308 and then to at least one transmit module 604. In some examples, a portion of the transmit test signal as output from the baseband processor 606 may be coupled to the IQ vector signal comparison module 604 via the optical splitter 610. The transmit module 604 may then be operable to output an RF resultant transmit test signal to the IQ vector signal comparison module 604 via the RF switch matrix 325 and at least one externally connectable RF test port module 370. The IQ vector signal comparison module 604 may then be operable to compare the initial transmit test signal as coupled via the optical splitter 610 with the resultant transmit test signal output from the at least one external RF test port module 370, thereby determining, say, a possible amplitude and/or phase difference between the two signals. In some examples, these two compared signals may need to be transformed to a domain where they can be readily compared, such that, for example, they are both in the digital domain or both in the RF domain. This may be part of the functional apparatus of the IQ vector signal comparison module 604.

In some examples, the results are measured on coupled versions of signals present at, or presented to, the antenna element feed(s) 410 through, for example, coupler 412. Therefore, in some cases, the results may need to be scaled to ensure that the signal level and phase present at the antenna element feed 410 is accounted for in the test results. For example, a 20 dB coupler may be used for coupler 412, where the losses through RF switch matrix 325 may be, for example, 10 dB. Therefore, in this example the amplitude of the signals presented from, say, signal generator 504 of FIG. 5, on externally connectable RF test port module 370 may be 30 dB higher than those present at antenna element feed 410. In some examples, there may be variations in the phase and/or amplitude transfer function between a signal that is presented on the connectable RF test port module 370 and the individual coupler 412 within the switch coupler structure 328 and another individual coupler also within the switch coupler structure 328.

In order for the measurements described hereinto fore to translate to that present on the antenna element feed 410, the variations in the transfer functions between the connectable RF test port module 370 and the antenna element feed 410 may be considered in some examples. It is also understood by the inventors that these/any amplitude and/or phase offset parameters may not be identical on a given AAS 600 as, for example, the signal routing of a first individual coupler 412 to that of a second individual coupler to that of the externally connectable RF test port module 370 may include more switching paths for one coupler to be switched or may include a variation in length of co-axial transmission line to a coupler. Furthermore, there may be unit-to-unit variations in performance, such as those induced by process parameters on a PCB used. For this reason many of the results may need to be scaled in order to translate to an indicated performance as though tested with a 50Ω test port in place of the antenna element 350 connectable to antenna element feed 410.

In some examples, scattering parameters (S-parameters), such as a Touchstone® format S-parameter file, may be utilised that represents a transfer function from the port of an antenna element 350 to at least one external RF test port module 370. In some examples, a scattering parameter transfer function may be generated and stored in a data file format for each antenna element 350 and external RF test port module 370, resulting in multi-port transfer functions. Such a data file of scattering parameter data may provide the transfer function as a function of frequency, for amplitude and phase variations when connecting the antenna element feed 410 to externally connectable RF test port module 370. This data may be stored in Cartesian ('I' and 'Q') format or may be stored as a dB amplitude/phase value in degree format. In some examples, it is envisaged that these S-parameters may be provided by the AAS manufacturer during fabrication of the AAS for use by anyone testing the AAS 600 thereafter. In some examples, vector network analysers may be utilised to generate this format file for the insertion loss and phase delay, for example, of the AAS during manufacture. In further examples, Z, Y, H and X parameters may be used instead of S-parameters, as will be understood by skilled artisans.

The S-parameter can be used to scale some measurements results obtained in the test procedure, thus negating the routing of the signal through the switched coupler structure 328 including the coupler itself 412 to allow the result to be referenced to the antenna port as opposed to the externally connectable RF test port module 370.

Figure 7:
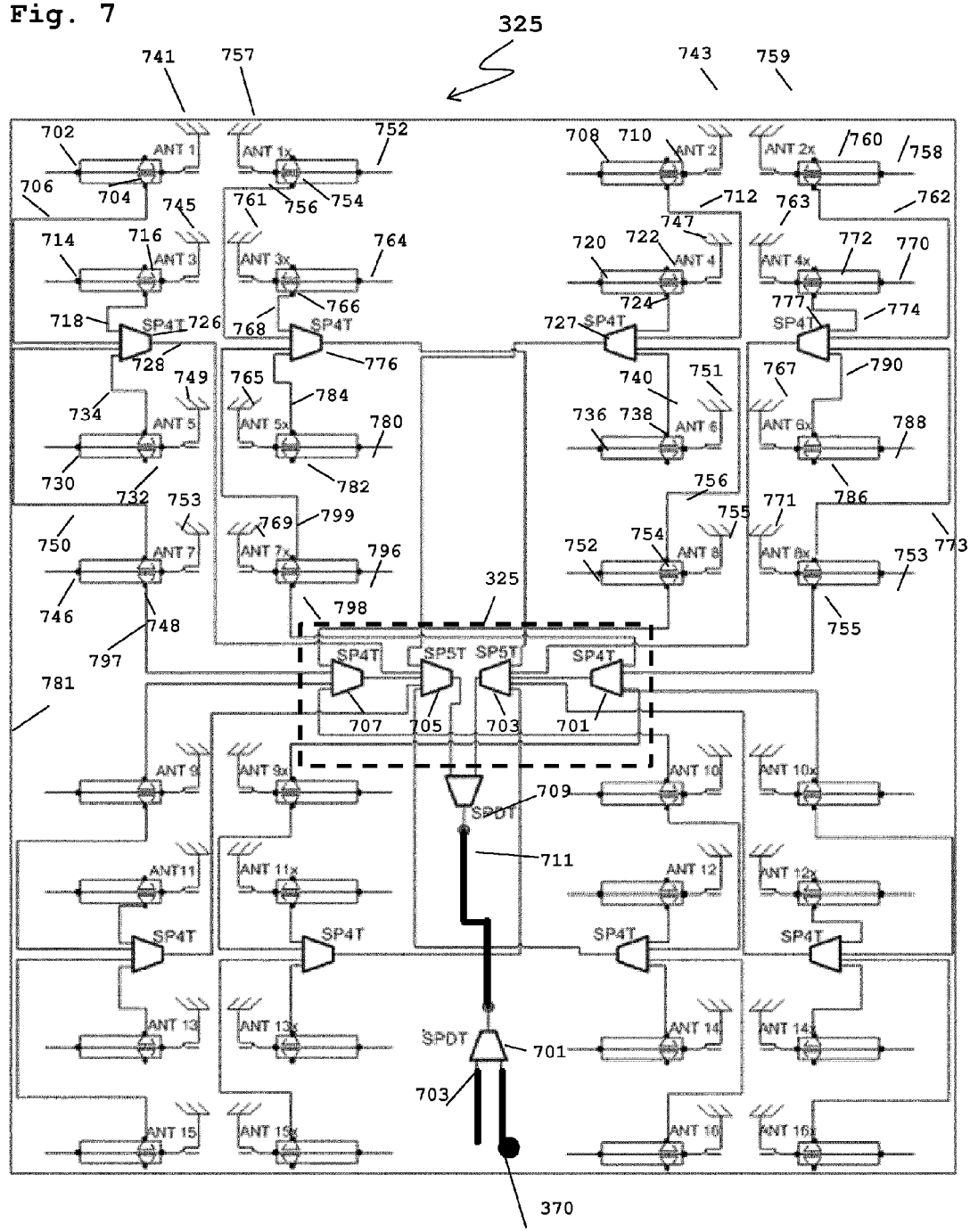
FIG. 7 illustrates an example of a radio frequency (RF) switch matrix and coupler structure according to aspects of the invention.

Referring to FIG. 7, a more detailed example of an RF switch matrix 325 and coupler structure for routing test signals between part of an AAS and at least one external RF test port module 370 is shown. The example RF switch matrix 325 and coupler structure of FIG. 7 comprises an antenna array containing sixteen cross polarised antenna elements of two columns and eight rows, each element with a coupled feedback structure connected through a plurality of RF switch devices to a common feedback point for all antennas and all polarisation types.

Thirty two transceiver ports are illustrated in the RF switch matrix 325 and coupler structure of FIG. 7. For simplicity purposes only a top half of the antenna coupler array sections will be described. It will be appreciated that the symmetric nature does not warrant further description. Sixteen XPOL antenna element pairs are utilised in the antenna array. The antenna elements comprise of sixteen elements of −45° polarisation 741, 743, 745, 747, 749, 751, 753, 755 and sixteen elements of +45° polarisation 757, 759, 761, 763, 765, 767, 769, 771. Each antenna element of both polarisation types is individually operably coupled to a first port of a respective coupler structure 704, 754, 760, 710, 716, 764, 722, 772, 726, 732, 782, 738, 788, 748, 798, 754. Thirty two transceiver ports 702, 752, 708, 758, 714, 764, 720, 770, 730, 780, 736, 788, 746, 792, 752, 753 are also each individually operably coupled to a second port of the respective coupler structures 704, 754, 760, 710, 716, 764, 722, 772, 726, 732, 782, 738, 788, 748, 798, 754. Each transceiver port 702, 752, 708, 758, 714, 764 720, 770, 730, 780, 736, 788, 746, 792, 752, 753 is also operably coupled to a respective transceiver port on the transceiver array in the communications element, for example to the plurality of parallel transceiver circuits 301 and calibration transceiver 311 of FIG. 6. Sixteen transceiver ports 702, 752, 708, 758, 714, 764, 720, 770, 730, 780, 736, 788, 746, 792, 752, 753 are operably coupled to the plurality of parallel transceiver circuits 301 and another sixteen transceiver ports are operably coupled to the calibration transceiver 311. Coupler structures 704, 754, 760, 710, 716, 764, 722, 772, 726, 732, 782, 738, 788, 748, 798, 754 have two couple ports, of which a minimum of one couple port is operably coupled to RF switch network 726, 727, 707, 701, 776, 766, 777, 703, 705, 709.

Each one of the thirty two transceiver ports 702, 752, 708, 758, 714, 764, 720, 770, 730, 780, 736, 788, 746, 792, 752, 753 comprise of, or comprise a part thereof, an antenna element feed, for example 410.

The RF switch network allows the calibration transceiver 311 to operably couple to a single respective coupler structure port at a particular instant of time. The calibration transceiver 311 is operably connected to the RF switch network output port 711. In this example, RF switch network 726, 776, 727, 777, 707, 705, 709 and 701 may be comprised in RF switch matrix 325. Furthermore, the signal presented at RF switch network output port 711 may be selected to be operably coupled to either the calibration transceiver 311 or least one externally connectable RF test port module 370. As discussed, in some instances, there may be a potential failure within a sealed AAS, for example AAS 600 illustrated in FIG. 6. In this case, the calibration transceiver 311 may not be able to identify or re-calibrate the AAS as the failure may relate to one or more components within the plurality of parallel transceiver circuits 301, one or more antenna element feeds 410, or within the calibration transceiver 311 itself, or indeed within the RF switch matrix 325.

In this example, the least one external RF test port module 370 is operably coupled to at least one output from RF switch 701. In this case, test signals routed via the at least one externally connectable RF test port module 370 extend beyond the illustrative casing 781 and, therefore, may allow for external connectivity between the externally connectable RF test port module 370 and the RF switch matrix 325. In a normal (non-external test) mode of operation example, the network port 711 may be utilised to, through the selection of RF switch 701, operably couple to a transmit module or a receive module 301 to/from calibration transceiver 311. When external test equipment is coupled to externally connectable RF test port module 370, RF switch 701 can be selected to route signals either to/from calibration transceiver 311 or operably couple to/from a transmit module or a receive module 301 to externally connectable RF test port module 370. Therefore, in this case, the at least one externally connectable RF test port module 370 may allow various components of the AAS 600 and calibration transceiver 311 to be tested without having to disassemble or break any environmental or security seals around the illustrative casing 781.

The operation of RF switch matrix 325 and coupler structure of FIG. 7 may be better understood when considering the following example signal flows.

For example, a signal on Ant3 745 can be coupled back/through coupler structure 716 to a RF switch device port 718. The RF switch 726 can be selected to output/input this coupled signal to RF switch 705. The RF switch 705, of RF switch matrix 325, can input/output this signal to the single-pole double-throw (SPDT) switch 709, whose output port may be operably coupled to RF switch 701. RF switch 701 can be selected to operably couple signals to/from the calibration transceiver 311 of FIG. 6 and/or at least one externally connectable RF test port module 370, for example. In some examples, the SPDT RF switch 709 and or other RF switches may be operable to switch between calibration transceiver, one or more transmit modules, one or more receive modules and at least one external RF test port module 370. Advantageously, a minimum of one external RF test port module could be utilised for all aspects of testing. Let us consider a case of a transmitter calibration feedback selection using a signal on Ant7 753. If the signal coupled back measured differently between the different feedbacks, e.g. via RF switch 726 port A 750 and a different RF switch 707 port B 797, then it may be assumed that the error may be attributed as a feedback path mismatch. This feedback mismatch may then be negated from the corresponding phase/amplitude/latency correction of all signal paths using RF switch 726 output A 718, thus substantially minimising the feedback error. Furthermore, this mismatch error can be applied to all other signals coupled through RF switch A.

Conversely for receive calibration, a signal may first be input to RF switch port A 718, then RF switch port B 797, and corresponding receive measurements will allow negation of mismatch on the feed-forward calibration signal paths. In the case whereby test modes of operation are invoked and signals are detectable through at least one externally connectable RF test port module 370, it is possible for the performance of the switch coupler structure 325 to be measured and correlated with for example S-parameter data supplied by the AAS 600 manufacturer. In some examples, it may also allow for the performance of the switched matrix structure 325 to be measured, thereby providing a means for testing of circuits associated with switched matrix structure 325.

In cases where the calibration transceiver 311 is unable to quantify and/or generate any feedback signal, for example where there is a failure with one or more components, antenna elements feed 410 or with the calibration transceiver itself, the at least one external RF test port module 370 may be operable to input at least one test signal from an external test source (not shown), in a receive mode, to the RF switch matrix 325. Further, the at least one external RF test port module 370 may be operable to receive a resultant or apply a test signal from the RF switch matrix 325 and output to an external test measurement/signal comparison unit (not shown).

The proposed coupler matrix and associated RF switch matrix 325 is able to scale below and beyond a use of thirty two antennae, and is not restrictive to an array size. The respective antenna paths can be calibrated separately to determine absolute process path delays, phase response and amplitude response of signal processing path feeds to the antenna cross polarised antenna elements. These absolute responses may be compared with respect to each other in order to determine the mismatches on each path. By extension, in some examples, the proposed coupler matrix and associated RF switch matrix 325 is capable of being extended to allow for testing of array sizes greater or lesser than that defined herein.

Figure 8:
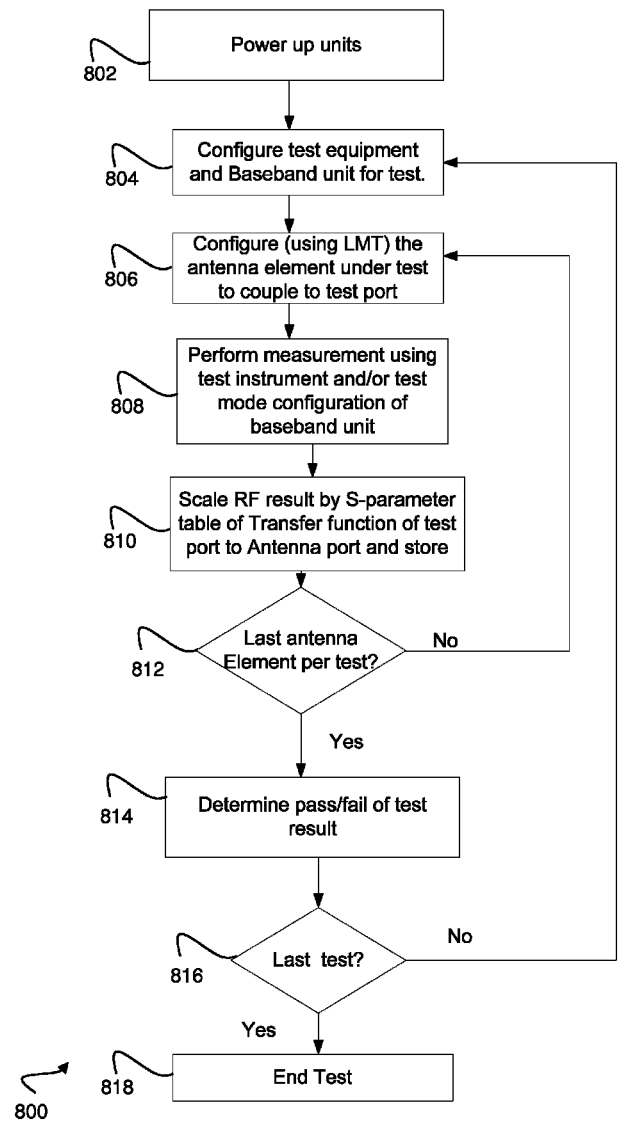
FIG. 8 illustrates an example of a flow chart for a simplified testing regime according to aspects of the invention.

Referring to FIG. 8, an example of a flow chart for a testing regime according to aspects of the invention is shown. In this example, operations are shown to correspond with the AAS 400 of FIG. 4. However, it should be noted that this is merely to aid the understanding of the reader, and the example(s) of FIG. 8 may be applicable to other test equipment modules 372 illustrated in other FIGS.

Initially, at 802, the AAS 400, RF test equipment 402, baseband processor 404 and LMT 406 may be powered up. At 804, the baseband processor 404 and RF test equipment module(s) may be configured in some examples through the LMT 406 to be responsive to a chosen test mode, for example a receive or transmit test mode. At 806, the LMT 406 may configure a test route that a test signal may take, for example, the LMT may control switching of the coupling of an antenna element 350 for signals, for example present on antenna element feed 410, to at least one external RF test port module 370, via RF switch matrix 325, for example. At 808, the chosen test mode may be invoked by the LMT 406 which, in one example, may be a receive test mode. In this case, the at least one externally connectable RF test port module 370 may be operable to route a receive test signal transmitted from the RF test equipment 402, which may be routed via the RF switch matrix 325 onto at least one receive module 306 to be tested. The at least one receive module 306 may then be operable to output a signal(s) processed by system control and beamforming DSP module 308, via the CPRI interface 340, to the baseband processor 404, wherein the baseband processor 404 may also be communicable of a representation of the receive test signal routed from the RF test equipment 402.

In another example, the LMT 406 may be operable to invoke a transmit test mode via the baseband processor 404 and the CPRI interface 340. In this case, a transmit test signal may be transmitted by the baseband processor 404, via CPRI interface 340, processed by system control and beamforming DSP module 308, to at least one transmit module 304. The resultant signal, or portion thereof (having passed through the selected transmit module), may then be transmitted to the RF test equipment 402 before optionally being passed to the baseband processor module 404.

In some examples, the measured result(s) may be a coupled version(s) of signals for example present on antenna element feed 410 that is/are present at the antenna element 350 under test. Therefore, the measured result(s) may need to be scaled to be representative of the signals at the antenna elements. At 810, the RF results may be scaled using S-parameter values, for example using a Touchstone® format S-parameter file, from a table of transfer functions, and optionally subsequently include having the measured and scaled result stored. The S-parameter file for example may include an 'S21' parameter at a test frequency that may represent a transfer function from an antenna element 350 port to the at least one external RF test port module 370. The table of transfer functions may represent a matrix of transfer functions for each combination of antenna element 350 ports to the plurality of external RF test ports 371 that may be tested over the frequencies of interest. Therefore, multiport multi-frequency transfer functions may be available within the table of transfer functions. At 812, the LMT 406 hosted test program or operator may determine whether any further antenna element feed 410 needs to be selected for testing. If the LMT 406 hosted test program or operator determines that there is another antenna element feed 410 signals to test, the process loops back to 806 and the LMT 406 may be configured to the new antenna element 350 and/or transmit module and/or receive module to be tested. Otherwise, the process moves onto 814, wherein the baseband processor 404 or the LMT 406 hosted test program may be operable to compare the resultant test result, scaled by the scattering parameters where appropriate to a predefined specification limit to determine whether there is a failure, e.g. whether a pass/fail threshold has been exceeded, within the AAS. At 816, the LMT 406 hosted test program or operator may determine whether there is another test, for example receive or transmit test, to perform. If the LMT 406 hosted test program or operator determines that there is another test to perform, the process may loop back to 804, and the baseband processor and RF test equipment 402 may be configured to invoke another test. Otherwise, the test procedure terminates at 818. In some examples, a combination of multiple antenna element results may be required to determine a pass or fail at 814. This may be, for example, where output power of an antenna array 310 needs to be tested. In this case, a summation of a number of test results may be required as the transmitter output from all antenna elements would result in the RF output power from the array 310. In some examples, the determination of a pass or fail of a test result may be set against limits defined by customer requirements or standards requirements.

Figure 9:
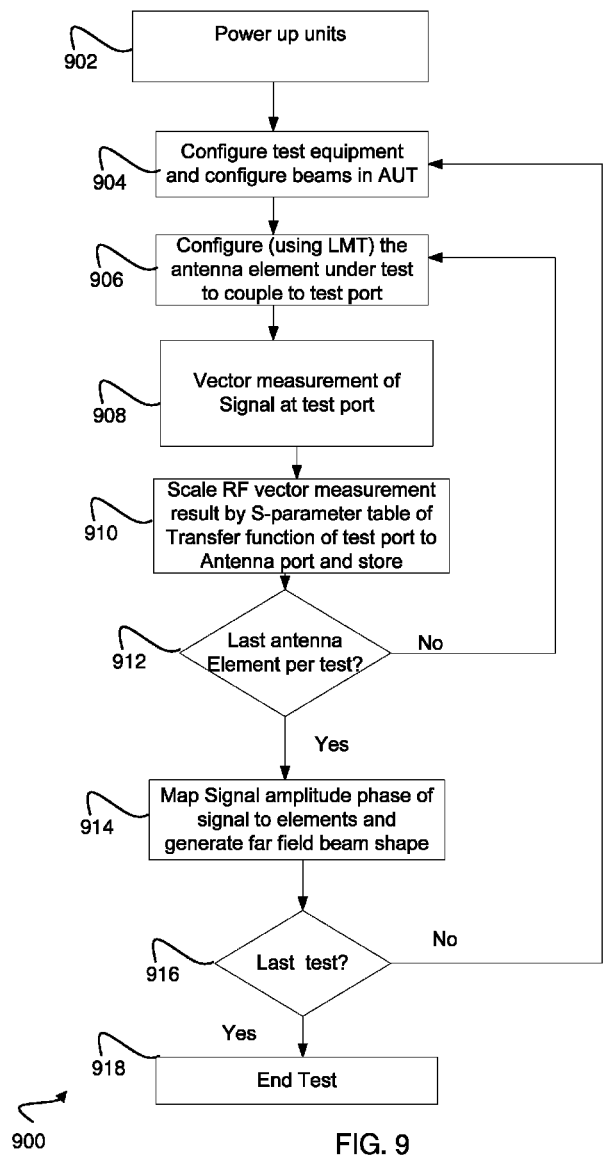
FIG. 9 illustrates an example of a flow chart for a simplified determination procedure of beam forming capability of an antenna under test according to aspects of the invention.

Referring to FIG. 9, an example of a flow chart for a determination procedure of beam forming capability of an antenna under test is shown, according to aspects of the invention. In this example, operations are shown to correspond with the AAS 600 of FIG. 6. However, it should be noted that this is merely to aid the understanding of the reader, and the example(s) of FIG. 9 may be applicable to other test equipment modules 372 illustrated in other FIGS.

Initially, at 902, the AAS 600, test equipment, for example vector signal generator 602 and IQ vector signal comparison module 604, baseband processor 606 and LMT 608 may be powered up and, at 904, may be configured to be responsive to a chosen test mode. Further, beams within the AAS 600 may be configured for beam generation, which in some examples may encompass a mode of operation that sets beam characteristics, such as, for example, tilt, beam width polarisation and/or power, to be included in the configuration. At 906, the LMT 608 may configure a test route that a test signal may take, for example, the LMT 608 may control the coupling of an antenna element 350 to at least one externally connectable RF test port module 370. At 908, a vector measurement of the test signal at the externally connectable RF test port module 370 may be performed. The measurement at the externally connectable RF test port module 370 maybe a RF transmit test signal coupled through RF switch matrix 325, or a relayed receive test signal from vector signal generator 602, for example. An explanation of receive and transmit test signal operation is illustrated in FIG. 6 and, therefore, these procedures will not be repeated here so as not to obfuscate aspects of the invention. However, in summary, a phase and amplitude measurement may be performed for signals present at each antenna element 350 as coupled at antenna element feed 410 within the antenna array 310, which may be performed by IQ vector comparison module 604 to estimate the transfer function between the antenna element feed signal and the representation thereof on the CPRI interface. In a receive test mode, the IQ vector comparison module 604 may reconstruct the received signal from CPRI 340 (in serial format) to an IQ vector signal and compare this with the IQ signal initially generated by vector signal generator 602 as input to the at least one externally connectable RF test port module 370. An amplitude and phase difference may be measured between these two signals before an S-parameter scaling procedure is carried out at 910 to accurately translate the measurement to be a reference to the antenna element feed 410 rather than the externally connectable RF test port 370. At 910, in one example, a beamforming transfer function through to an antenna element 350 may be determined. At 912, the LMT 608 may determine whether there is another antenna element 350 to test within the antenna array 310. If the LMT 608 test program or operator determines, at 912, that there is another antenna element 350 to test, the process may transition back to 906 and the LMT 608 operator or test program may be configured to the new antenna element 350 to be tested. Otherwise, the process may move onto 914, wherein, using a beamform calculator and knowing the spacing between antenna elements 350, a far-field beam shape can be extrapolated. It is known in the art that if the individual element beamshape is known apriori, and the dimensions of the array are known, the frequency of operation is known, then the beam generated can be accurately computed.

In a transmit test mode, the baseband processor 606 may transmit a transmit test signal via the CPRI 340 interface, wherein a portion of the test signal may be forwarded to the IQ vector signal comparison module 604 for example through optical splitter 610. An amplitude and phase of the transmitted test signal and resultant test signal from at least one externally connectable RF test port module 370 may be measured at the IQ vector signal comparison module 604 and, at 914, using a beamform calculator and knowing the spacing between antenna elements 350, a far-field beam shape can be extrapolated. At 916, the LMT 608 may determine whether there is another test to perform. If the LMT 608 determines that there is another test to perform, at 916, the procedure may transition back to 904. Otherwise, the procedure may terminate at 918.

The abovementioned methods and apparatus may also be utilised in a production environment, as a means of calibrating the output power of the antenna array(s) 310, for example. Current 3GPP™ standards call for accurate RF power testing, which can be provided utilising aspects of the invention.

Further, the abovementioned methods and apparatus may also be utilised in a restrictive space constrained methodology due to the use of, at least, at least one external RF test port module 370 and scaling factors. Utilising aspects of the invention may also allow more reproducible tests, as tests can be performed using conductive means, and, therefore, radiative performance uncertainties may be substantially reduced or eliminated.

In the case of field service personnel, for example, the abovementioned methods and apparatus may be utilised for investigating the performance of a network element. Utilising aspect of the invention may allow for many aspects of the performance of the AAS to be performed without breaking live network transmission. For example, live network downlink transmissions could be observed. Further, test modes for receiver performance could also be performed, whereby the signal input may be measured in the antenna under test (AUT) or in the baseband unit, allowing for a measurement report to be accessible over an LMT.

A potential problem with current AASs is that the radio and antenna array(s) are generally integrated. Therefore, the performance of the antenna array(s) is closely linked to the radio and beamforming capability of the system. Utilising aspects of the invention may alleviate some or all of the abovementioned problems, as conductive testing can be performed utilising, at least, the at least one externally connectable RF test port module 370. This may reduce the need to have to perform far field testing, which is not applicable to mass production environments.

Utilising aspects of the invention may also allow AAS manufacturers to ensure their antenna performance in terms of beamforming, where end of line testing space and speed may be critical.

Figure 10:
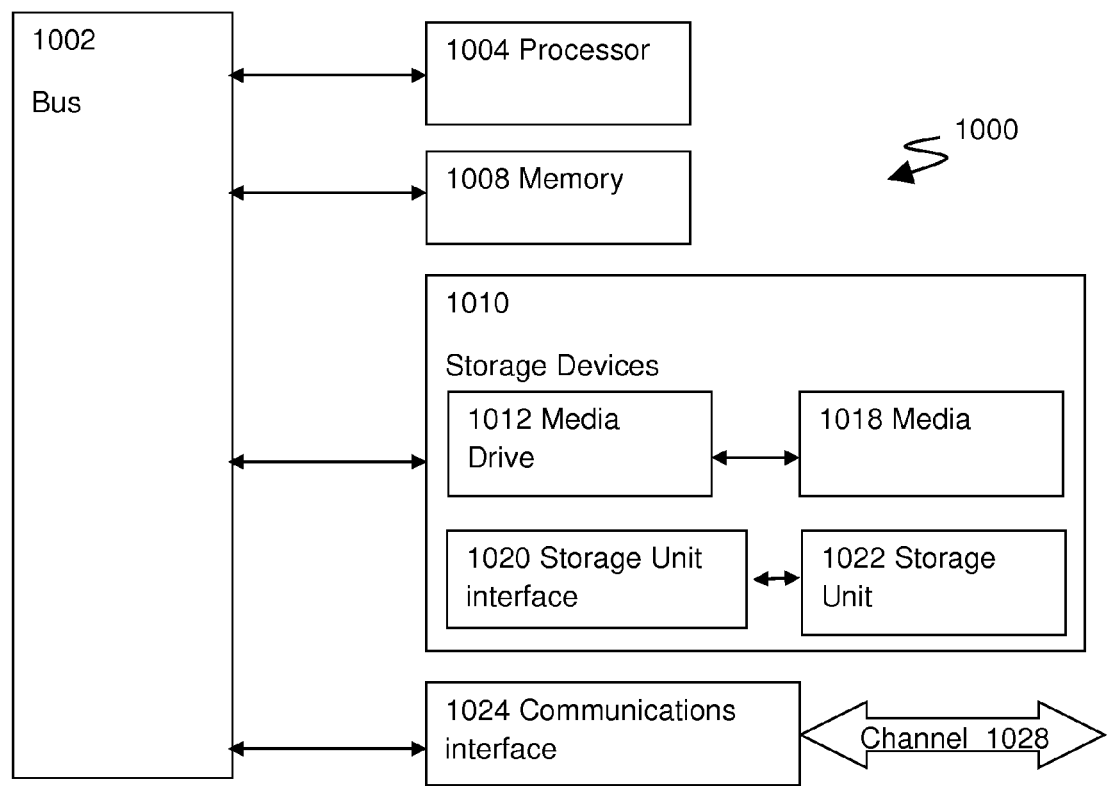
FIG. 10 illustrates an example of a simplified computer system that utilises aspects of the invention.

Referring now to FIG. 10, there is illustrated a typical computing system 1000 that may be employed to implement signal processing functionality in embodiments of the invention. Computing systems of this type may be used in network elements/wireless communication units. In some examples, the computer program and storage media may be located in the cloud or somewhere in the network of the operator environment, for example at an Operations and Management Centre (OMC). Those skilled in the relevant art will also recognize how to implement the invention using other computer systems or architectures. Computing system 1000 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1000 can include one or more processors, such as a processor 1004. Processor 1004 can be implemented using a general or special-purpose processing engine such as, for example, a microprocessor, microcontroller or other control logic. In this example, processor 1004 is connected to a bus 1002 or other communications medium.

Computing system 1000 can also include a main memory 1008, such as random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory (ROM) or other static storage device coupled to bus 1002 for storing static information and instructions for processor 1004.

The computing system 1000 may also include information storage system 1010, which may include, for example, a media drive 1012 and a removable storage interface 1020. The media drive 1012 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1018 may include, for example, a hard disk, floppy disk, magnetic tape, optical disk, CD or DVD, or other fixed or removable medium that is read by and written to by media drive 1012. As these examples illustrate, the storage media 1018 may include a computer-readable storage medium having particular computer software or data stored therein.

In alternative embodiments, information storage system 1010 may include other similar components for allowing computer programs or other instructions or data to be loaded into computing system 1000. Such components may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1018 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other NIC card), a communications port (such as for example, a universal serial bus (USB) port), a PCMCIA slot and card, etc. Software and data transferred via communications interface 1024 are in the form of signals that can be electronic, electromagnetic, and optical or other signals capable of being received by communications interface 1024. These signals are provided to communications interface 1024 via a channel 1028. This channel 1028 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' computer-readable medium' and the like may be used generally to refer to media such as, for example, memory 1008, storage device 1018, or storage unit 1022. These and other forms of computer-readable media may store one or more instructions for use by processor 1004, to cause the processor to perform specified operations. Such instructions, generally referred to as 'computer program code' (which may be grouped in the form of computer programs or other groupings), when executed, enable the computing system 1000 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1000 using, for example, removable storage drive 1022, drive 1012 or communications interface 1024. The control logic (in this example, software instructions or computer program code), when executed by the processor 1004, causes the processor 1004 to perform the functions of the invention as described herein.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second' etc. do not preclude a plurality.

The invention claimed is:

1. An active antenna test system comprising:
   at least one communication test equipment, wherein the at least one communication test equipment comprises at least a vector voltmeter;
   an active antenna unit comprising:
      a plurality of antenna elements;
      at least one processor;
      a plurality of transceiver modules operably coupled to the at least one processor, wherein the plurality of transceiver modules are arranged to receive one or more first baseband signals from the at least one processor for transmission via at least one of the plurality of antenna elements, and to pass one or more second baseband signals to the at least one processor received and down-converted from at least one of the plurality of antenna elements;
      a plurality of antenna element feeds coupled between the plurality of antenna elements and the plurality of transceiver modules;
      at least one externally connectable radio frequency (RF) test port; and
      at least one switching module operably coupling the plurality of antenna element feeds to the at least one externally connectable RF test port,
   wherein the at least one externally connectable RF test port is arranged to externally couple the at least one communication test equipment to at least one of the plurality of transceiver modules for conductive testing such that the at least vector voltmeter can determine a vector error due to a component or circuit fault in the active array unit.

2. The active antenna test system of claim 1, wherein in a receive mode of operation, the at least one communication test equipment conductively applies art RF test signal to the at least one externally connectable RF test port, and the at least one switching module is arranged to route the RF test signal through a selected receive module of the plurality of transceiver modules.

3. The active antenna test system of claim 2, wherein the at least one processor is a baseband processor and the selected, receive, module provides a digitized representation of RF test signal to the baseband processor to determine a performance of the selected receive module.

4. The active antenna test system of claim 2, wherein in a transmit mode of operation, the at least one processor routes a baseband test signal through a selected transmit module of the plurality of transceiver modules.

5. The active antenna test system of claim 4, wherein the at least one switching module is arranged to route the RF test signal from the selected transmit module to the at least one communication test equipment via the at least one externally connectable RF test port to perform at least of determining whether a fault exists or measuring a performance of the selected transmit module.

6. The active, antenna test system of claim 4, wherein each of a plurality of transmit modules of the plurality of transceiver modules is successively selected such that the at least one communication test equipment is able to determine a performance of the plurality of transmit modules.

7. The active antenna test system of claim 6 wherein the at least one communication test equipment is arranged to determine whether a fault exists in any of the plurality of transmit modules.

8. The active antenna test system of claim 1 further comprising a calibration transceiver operably coupled to the at least one switching module and arranged to selectively apply signals to the at least one externally connectable RF test port is the at least one switching module or receive signals from the at least one externally connectable RF test port via the at least one switching module to determine a performance of the calibration transceiver.

9. The active antenna test system of claim 1, wherein the at least one switching module comprises a switched coupler network comprising a plurality of coupler ports, wherein the switched coupler network receives 4 control signal form the at least one processor in order to select a transmit module or receive module for routing a test signal via at least one of the plurality of coupler ports.

10. The active antenna test system of claim 1, wherein the at least one communication test equipment comprises a scaling process arranged to scale a conductively coupled signal to negate a transfer function of a signal routed between the at least one externally connectable RF test port and a respective antenna port of the plurality of antenna elements.

11. The active antenna test system of claim 10, wherein the sealing process is operably arranged to modify at least one test result using a scaling factor that is accessible to a tester.

12. The active antenna test system of claim 11, wherein the scaling process uses a table of transfer functions that represent a matrix of transfer functions for a plurality of combinations of antenna elements to the at least one externally connectable RF test port.

13. The active antenna test system of claim 12, wherein the table of transfer functions comprises at least one of: a S-parameter table, a H-parameter table, a parameter table, a Y-parameter table, or a Z-parameter table for at least one RF frequency of operation.

14. An active antenna unit comprising:
   a plurality of antenna elements;
   at least one processor;
   a plurality of transceiver modules operably coupled to the at least one processor, wherein the plurality of transceiver modules are arranged to receive one or more first baseband signals from the at least one processor for transmission via at least one of the plurality of antenna elements, and to pass one or more second baseband signals to the at least one processor received and down-converted from at least one of the plurality of antenna elements
   a plurality of the antenna element feeds coupled between the plurality of antenna elements and the plurality of transceiver modules;
   at least one externally connectable RF test port; and
   at least one switching module operably coupling the plurality of antenna element feeds to the at least one externally connectable RF test port,
   wherein the at least one externally connectable RF test port is arranged to externally couple at least one of the plurality of transceiver modules to at least one communication test equipment for conductive testing wherein the at least one communication test equipment comprises at least a vector voltmeter such that the at least vector voltmeter can determine a vector error due to a component or circuit fault in the active array unit.

15. A method of testing, an active antenna system comprising a plurality of antenna elements operably cm pled to a plurality of transceiver modules, the method comprising:
   coupling at least one communication test equipment to at least one externally connectable RF test port of the active antenna system, wherein the at least one communication test equipment comprises at least a vector voltmeter, wherein the at least one externally connectable RF test port is coupled to at least one switching module;
   selectively coupling the at least one externally connectable RF test port, via the at least one switching module, to an antenna element feed that is coupled between an antenna element and at least one of a radio transmit module under test or a radio receive module under test;
   conductively coupling a test signal via the at least one external RF test port to or from the transmit module or the receive module under test; and
   performing at least one signal measurement on the test signal passing through the transmit module or the receive module under test such that the at least vector voltmeter can determine a vector error due to a component or circuit fault in the active array unit.

16. The method of testing an active antenna system of claim 15 further comprising at least one of:
   successively selecting is plurality of receive modules to determine whether a fault exists in any of the receive modules;
   successively selecting a plurality of transmit modules to determine whether a fault exists in any of the transmit modules; or
   selectively coupling a test signal via the at least one externally connectable RF test port and the at least one switching Module to a calibration transceiver in the active antenna system to determine whether a fault exists in the calibration transceiver.

17. The method of testing an active antenna system of claim 15 further comprising scaling a conductively coupled test signal to negate an effect on a test result of a transfer function of a signal routed between the at least one externally connectable RF test port and a respective antenna port of the active antenna system.

18. The method of testing an active antenna system of claim 17, wherein scaling comprises employing a table of transfer functions that represent a matrix of transfer functions for a plurality of combinations of antenna elements to a plurality of external RF test ports for at least one frequency of test.

19. The method of testing an active antenna system of claim 18, wherein the table of transfer functions comprises at least one of a S-parameter table, a H-parameter table, a X-parameter table, a Y-parameter table, or a Z-parameter table for at least one frequency of test.

20. The method of testing an active antenna system of claim 15 further comprising at least one of:
   comparing a measured result of the test signal having passed through the transceiver module under test with at least one predetermined upper or lower limit value;
   comparing a sealed measured result of the test signal having passed through the transceiver module under test with at least one predetermined upper or lower limit value; or
   comparing a measured result of the test signal having passed through the transceiver module under test with the generated test signal.

* * * * *